Figure 5:
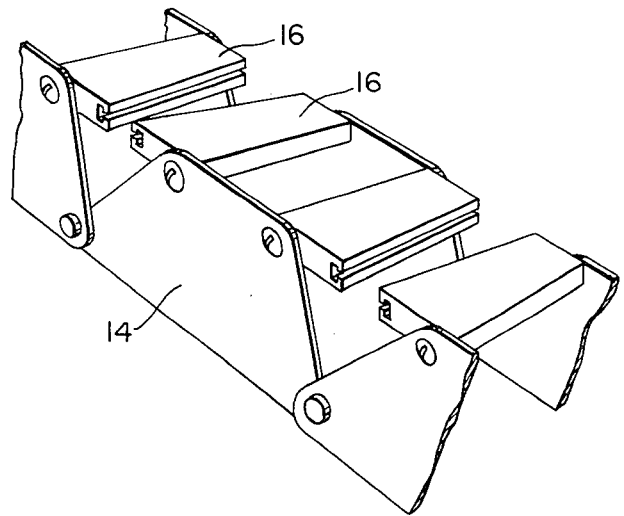

United States Patent [19]

Pierce

[11] 4,113,210
[45] Sep. 12, 1978

[54] FLEXIBLE AEROFOILS

[75] Inventor: Donald Pierce, Aldershot, England

[73] Assignee: The Secretary of State for Defence in Her Britannic Majesty's Government of the United Kingdom of Great Britain and Northern Ireland, London, England

[21] Appl. No.: 781,866

[22] Filed: Mar. 28, 1977

[30] Foreign Application Priority Data

Apr. 1, 1976 [GB] United Kingdom ............... 13337/76

[51] Int. Cl.² ............................................... B64C 3/48
[52] U.S. Cl. .................................................... 244/219
[58] Field of Search ............... 244/219, 214, 215, 218; 416/23, 240

[56] References Cited

U.S. PATENT DOCUMENTS

| | | | |
|---|---|---|---|
| 1,365,346 | 1/1921 | Schenkel | 244/219 |
| 1,868,748 | 7/1932 | Hogan | 244/214 |
| 2,448,712 | 9/1948 | Hampshire | 244/215 |
| 3,179,357 | 4/1965 | Lyon | 244/219 |
| 3,698,668 | 10/1972 | Cole | 244/219 |
| 3,836,099 | 9/1974 | O'Neill et al. | 244/214 |

*Primary Examiner*—Barry L. Kelmachter
*Attorney, Agent, or Firm*—Cushman, Darby & Cushman

[57] ABSTRACT

A flexible aerofoil has a series of members extending chordwise from a structure such as a main spar. The members are rotatably connected at points adjacent the pressure skin and are secured to the pressure skin. Rods, movable in a spanwise direction, act on the members at positions adjacent the suction skin to rotate the members relative to one another and therefore to alter the aerofoil camber.

3 Claims, 12 Drawing Figures

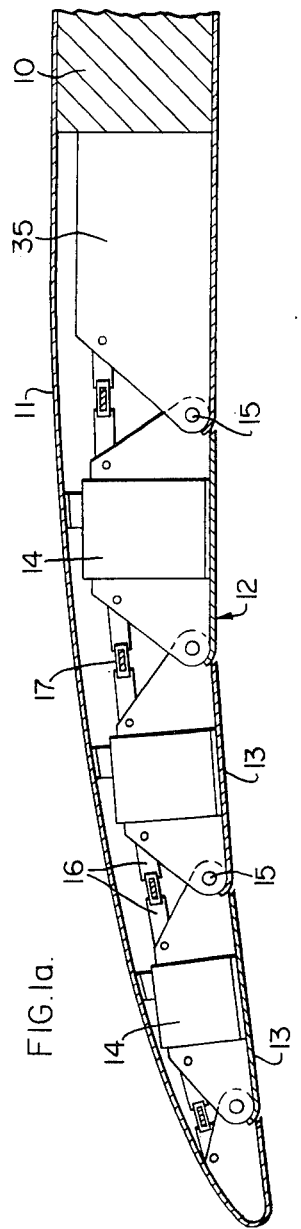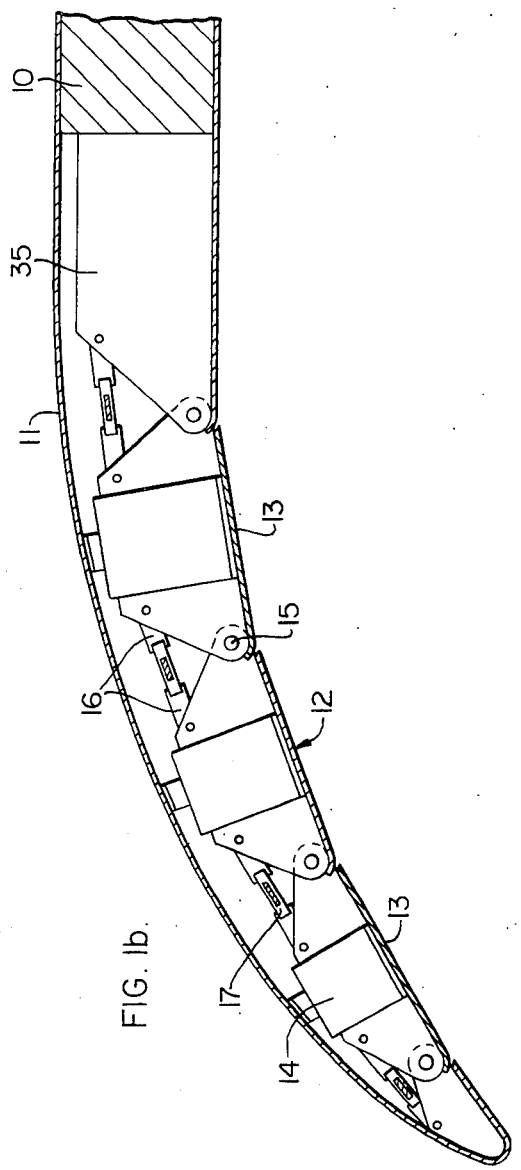
FIG. 1a.
FIG. 1b.

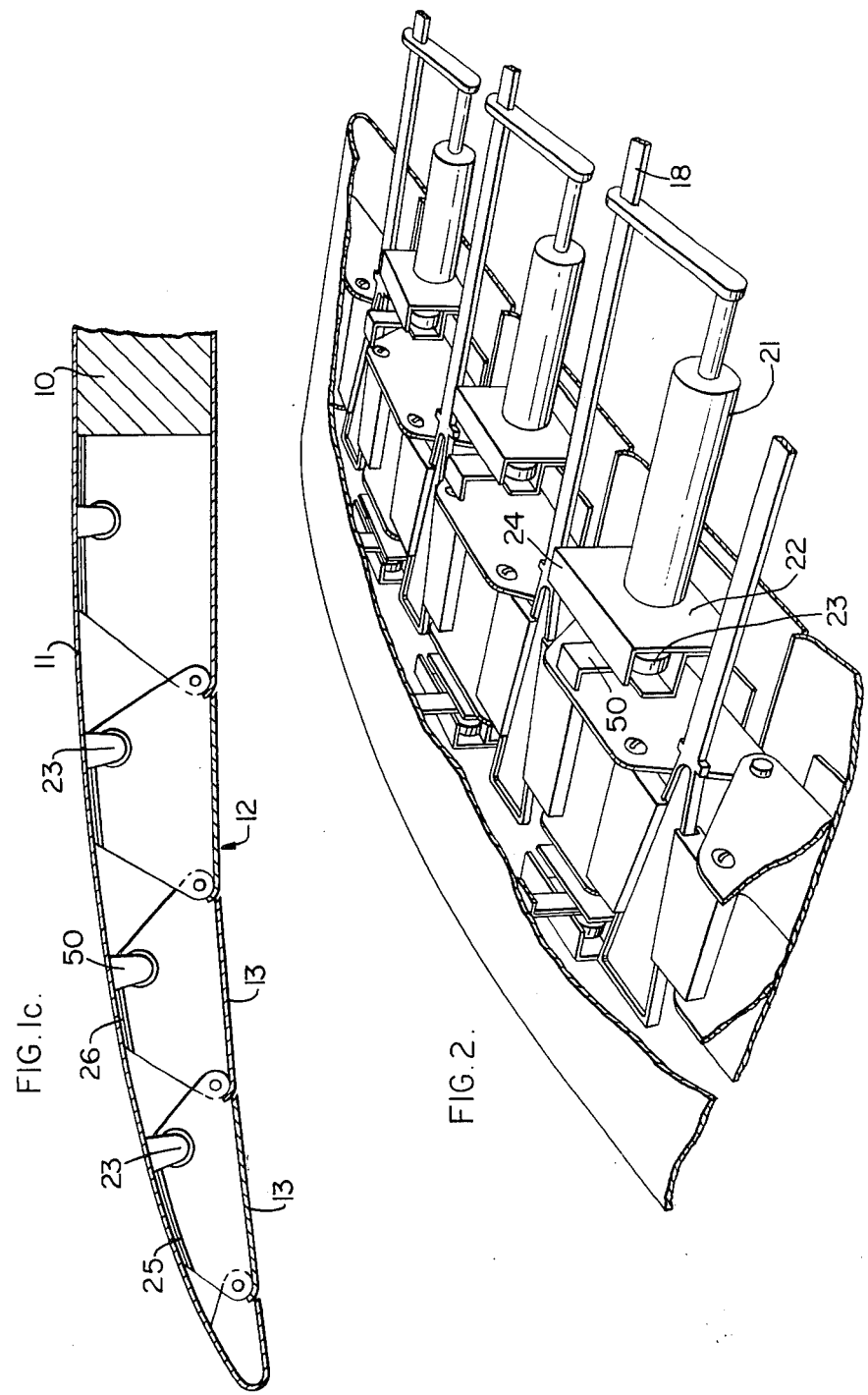

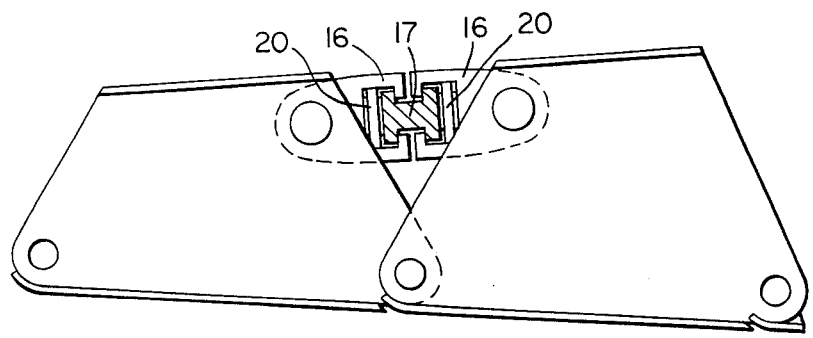
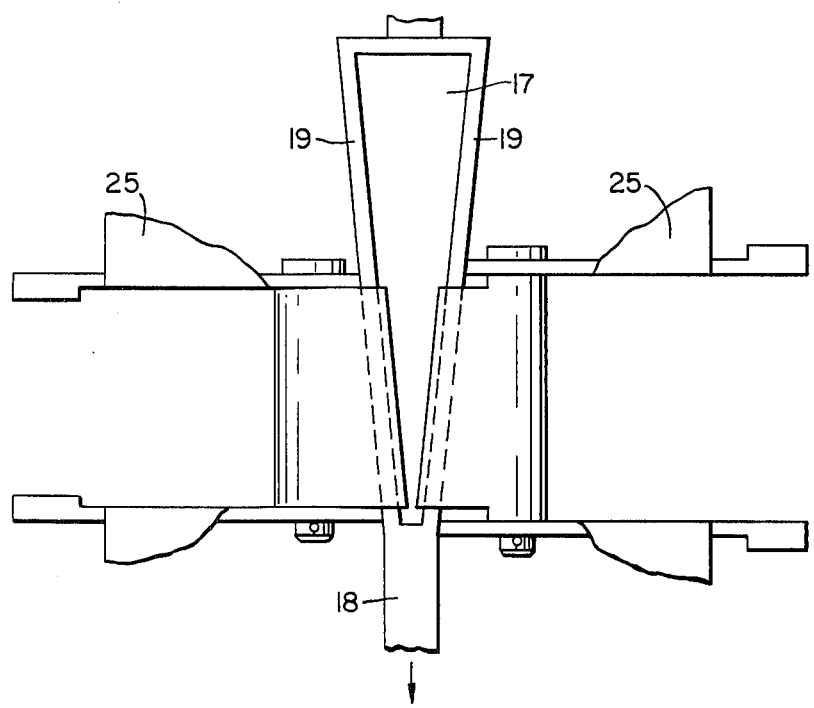

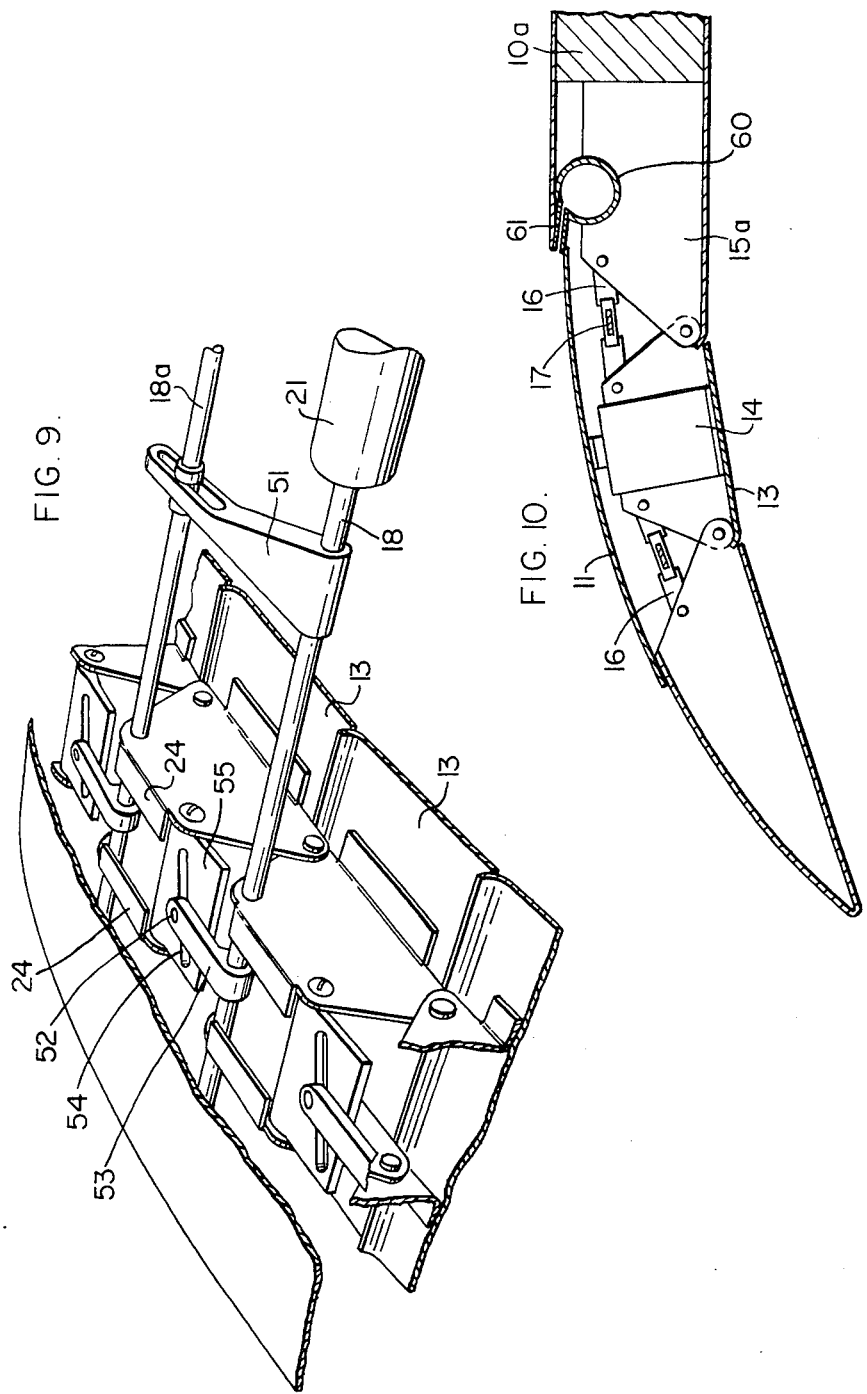

FLEXIBLE AEROFOILS

The present invention relates to lifting aerofoils.

When an airflow passes an aerofoil (in practice, of course, the aerofoil is moving through the air) lift is produced by the relative acceleration of the air over one surface and the relative retardation of the airflow over the other surface. This results in a decrease of pressure relative to the static air pressure over the first surface (henceforth referred to as the suction surface) and an increase in pressure relative to the static air pressure acting on the second surface (henceforth referred to as the pressure surface). Of these effects the reduction in pressure over the suction surface is the more significant. At the same time as producing lift (or even if no lift is being produced) a drag force tending to move the aerofoil in the direction of the airflow is induced. It is an objective in the design of an aerofoil that, at the speed at which the aerofoil is designed to spend most of its operating life, the ratio of lift to drag should be as high as possible. With this design objective the large speed range over which a modern aerofoil is expected to operate means that there are many flight conditions where the aerofoil is acting inefficiently. For example, a modern fighter aircraft will spend most of its operational life flying at high subsonic speed, will be expected to have the capability of flying at supersonic speed, and yet must have aerofoils which are sufficiently versatile to allow a safe landing speed.

Aerofoils which are efficient at high subsonic and supersonic speeds are inherently unsuitable for use at low speed. Consequently, for low speed flight, devices such as flaps and slats usually have to be used. The installation of such devices involves both additional expense in constructing the aerofoil and considerable mechanical complication.

It has frequently been suggested that, in addition to or as an alternative to devices such as the above, aerofoils should be so constructed that their shape can be changed during flight. There are many patents in existence teaching methods for doing this, either by altering the thickness/chord ratio, or by altering the aerofoil's camber (in effect the shape of the line joining the leading and trailing edges of the aerofoil and bisecting the aerofoil). Many of these suggestions proved to be impractical, either because of over complication, because they involved too great a weight penalty, or because they caused discontinuities to be formed in the suction surface of the aerofoil. In general deformities in the suction surface of an aerofoil are extremely disadvantageous in terms of both lift and drag, whilst similar discontinuities in the pressure surface are not so disadvantageous. One suggestion which does appear to have advantages, without insoluble disadvantages, is described in U.S. Pat. No. 3,716,209, and in UK Patent Specification 1296994. However this invention describes a system which is practicable for use only on wings of normal thickness to chord ratio. When used on wings of low thickness to chord ratio (for example, where the thickness to chord ratio is lower than 5%) the forces which must be applied to effect a required alteration in aerofoil profile become impracticably high. There is, currently, considerable interest in the development of aerofoils having low thickness to chord ratios (of the order of 5% or less), and of aerofoils of the type known as 'supercritical'. This invention provides a means, particularly suitable for use on aerofoils of low thickness to chord ratio, whereby the profiles of aerofoils may be altered.

According to the present invention an aerofoil includes internal structure, a suction skin and a pressure skin attached to the structure, a series of members extending chordwise from the structure between the suction and pressure skin, each member being secured to the pressure skin and being rotatably jointed, at a joint adjacent to the pressure skin, to a preceding member or to the fixed structure, for each joint a rod movable in a spanwise direction and means adjacent the suction skin connecting each rod to adjacent members or to a member and adjacent structure such that movement of the rod causes relative rotation of the members or member and a consequent change in the aerofoil camber, and means for maintaining the separation between the suction and pressure skins in a predetermined relationship.

Movement of each rod may be effected by, for example, a hydraulic or a pneumatic jack.

In practice series of members can be expected to be fitted at a plurality of spanwise stations on any particular aerofoil. Separate jacks can then be used for each rod at each joint, or a single jack can be used to operate a rod which acts at joints on more than one series of members. Rods acting at joints on more than one series of members may incorporate universal joints to allow for spanwise flexures of the aerofoil.

Some method must be found to allow for the extension or compression of the skins inherent in changing the aerofoil camber. In a preferred embodiment of the invention the pressure skin is in the form of a chordwise series of spanwise extending segments positioned adjacent to one another to provide a substantially continuous surface, each segment being rotatable relative to its neighbours by means of being secured to a member of each spanwise series of members.

In one means of connecting a rod to adjacent members a tapered cam rod having flanged sides is slidable in flanged channels secured to the associated members. In another means a spigot on a rod slidably fits within two channels, one channel being in each of two plates, one plate being attached to each member, the channels being angled in opposite directions relative to the direction of motion of the rod. In a third means a rod is constrained to move chordwise with one of the members, and is connected by a swinging link to the other member. Any combination of these, and other, means may be employed in a particular embodiment of the invention.

In a preferred means of maintaining the separation between the suction and pressure skins in a predetermined relationship rollers extending inwardly from the suction skin are positioned inwardly relative to flanges secured to the members.

Figure 8:
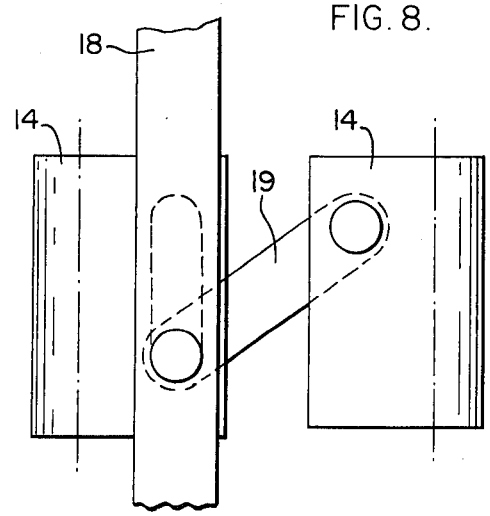
Figure 6:
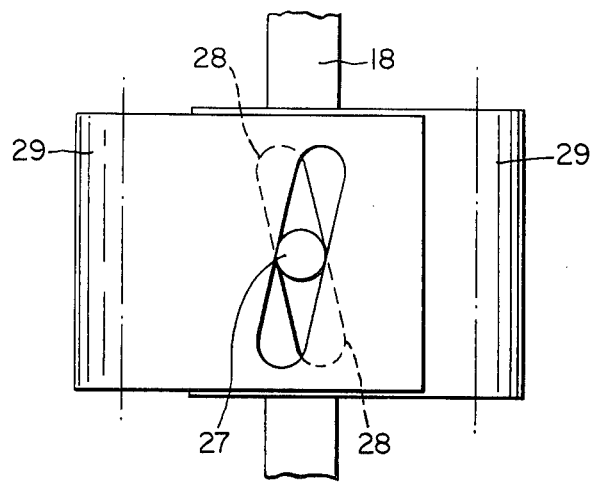
Figure 7:
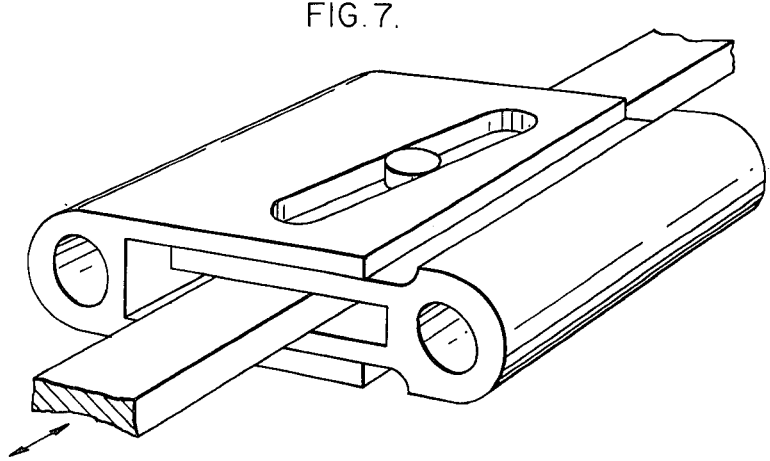

Some embodiments of the invention will now be described, by way of example, only, with reference to FIGS. 1 to 8 of the diagrammatic drawings accompanying the Provisional Specification, and the accompanying diagrammatic drawings, of which:

FIGS. 1a, b, and c are elevations, in section, of part of an aerofoil embodying the invention, FIG. 2 is a cutaway perspective view of the aerofoil, FIG. 3 is an elevation in section of a detail of the embodiment, FIG. 4 is a plan view of the detail shown in FIG. 3, FIG. 5 is a perspective view of the detail shown in FIGS. 3 and 4, FIG. 6 is a plan view of a detail of an alternative embodiment of the invention, FIG. 7 is a perspective view of the detail shown in FIG. 6, FIG. 8 is a plan view of another embodiment of the invention, FIG. 9 is a perspective view of a detail of yet another embodiment of the invention, and FIG. 10 is an elevation, in section, of another aerofoil embodying the invention An aerofoil (FIGS. 1 and 2) has a main spar 10 to which are attached a suction skin 11 and a pressure skin 12, the pressure skin 12 being in the form of a series of segments such as those shown at 13. Each segment 13 is secured to a member 14, the members 14 extending in series from a bracket member 35 secured to the main spar 10, and being rotatably joined together at joints such as that shown at 15 adjacent to the pressure skin 12. At each chordwise end of each member 14, adjacent the suction skin 11, is rotatably mounted a flanged channel section such as those shown at 16 (see particularly FIGS. 3, 4 and 5). A tapered cam 17 secured to a rod 18 has at each side a flange 19 which lies within a flanged channel 16, the flanged channel 16 being angled at the semi-angle of the tapered cam rod 17. Needle races 20 are fitted between the bases of the channels 16 and the flanges 19.

Each rod 18 (see FIG. 2) is operatively connected to an actuator, which might for example be a hydraulic jack, 21, mounted on a bracket 22 secured to a segment 13 of the pressure skin 12. Rollers such as those shown at 23 mounted on pillars 50 which extend inwardly from the suction skin 11 lie inwardly of, and bear against, flanges such as those shown at 24 on the bracket 22.

In operation when it is desired to alter the aerofoil's camber the actuators 21 are operated to move the rods 18 in a spanwise direction. Movement of the rods 18 operates via the tapered cam rods 17 and channels 16 to rotate the members 14 relative to one another and to the main spar 10. The aerofoil profile can thus be altered as illustrated in FIGS. 1a and 1b.

In an alternative construction, as illustrated in FIGS. 1c and 4 the rollers 23 bear on flanges on 25 secured to the members 14. Low friction material, as shown at 26, of PTFE or a similar substance secured to the outward facing surfaces of the flanges 25 serve to support the inner surface of the skin 11 during flight conditions where pressure, rather than the usual suction force, acts on the skin 11. As an alternative to rollers 23 flanged members (not shown) mounted on the suction skin 11 have their flanges lying inwardly of and bearing against flanges 24 or 25, the contacting faces of the flanges being surfaced with low friction material such as PTFE.

The mountings of the rollers 23 or flanges on the suction skin 11 should be, as near as is practical, point mountings to minimise any tendency for discontinuities to form in the suction skin profile as the aerofoil profile is altered.

In a alternative embodiment (FIGS. 6 and 7) a spigot such as that shown at 27 mounted on each rod 18 projects through channels 28 in plates 29 which are hinged to neighbouring members 14. The channels 28 are angled in opposite directions relative to the direction of motion of the rod 18.

In yet another embodiment of the invention (FIG. 8) each rod 18 is constrained to move in a chordwise direction with a member 14 and is connected by a swinging link 19 to the neighbouring member 14.

A master rod 18 (FIG. 9) can be ganged to a slave rod 18a by a link 51, the actuator 21 then acting only on the master rod 18. In the embodiment shown in FIG. 9 spigots 52 on spigot arms 53 secured to each rod 18, 18a each slide in an angled slot 54 in a plate 55 to cause relative movement of adjacent members 14.

It will be realised that whilst a series of members 14 is described above with reference to the accompanying figures as being positioned at a single spanwise aerofoil station, in practice such series of members 14 will be required at a plurality of spanwise stations. Each actuator 21 may then act on a rod 18 carrying a single cam 17 or similar device, or a plurality of such devices, acting on members at several spanwise stations. The profiles of the aerofoil may be altered by rotating one, several or all the members 14 of a series, and by differential operation of series of members 14 a spanwise variation of profile can be obtained.

The invention therefore provides the means for altering the aerofoil profile over a large range. It is common now for many of the operating characteristics of aircraft to be controlled by computers, and it is a logical step to extend computer control to control of the aerofoil configuration according to this invention.

Whilst in the above embodiment the thickness of the aerofoil is maintained substantially constant as the profile of the aerofoil is changed, some degree of control over the thickness can be achieved by, for example, suitable contouring of the flanges 24 or 25.

It will be apparent that the invention can be used for varying the profile of the upstream part, the downstream part, or both, of an aerofoil.

In one form of the invention as applied to the downstream part of an aerofoil, illustrated in FIG. 10, a discontinuity in the suction surface 11 has a slit 61 connected to a gas supply pipe 60. In use, gas is blown through the slit 61 over the surface 11, maintaining laminar flow thereover.

Where series of members 14 extend both upstream and downstream, upstream and downstream series may lie on common, or on different chords.

It will be apparent that the series of members 14 and the described methods of linking them results in a comparatively rigid structure. They therefore substitute for the ribs commonly found in conventional aerofoils, thus reducing the weight penalty inherent in using the invention. Use of the invention will also reduce the necessity for devices such as flaps, again reducing the weight penalty.

What I claim is:

1. A flexible aerofoil comprising:
   an internal structure including a bracket member;
   a suction skin attached to said internal structure;
   a pressure skin;
   a series of rotatable members extending chordwise from said bracket member, each of said rotatable members being joined to at least one adjacent member by at least one joint to form a chain-like structure;
   said pressure skin comprising a chordwise series of spanwise extending segments positioned adjacent to one another to provide a substantially continuous surface, each of said segments being secured to one of said members, said joints being adjacent said pressure skin, closer to the pressure skin than the suction skin;
   a rod mounted for movement only in a spanwise direction for each of said joints;

means, adjacent said suction skin, closer to the suction skin than the pressure skin, connecting each of said rods to two adjacent ones of said members such that movement of said rod causes relative rotation of the joined rotatable members about spanwise extending axes passing through said joints and a consequent change in camber of said pressure skin; and means connecting said suction skin to said rotatable members such that relative rotation of said rotatable members also causes a change in camber of said suction skin and such that the separation between said suction skin and said pressure skin is maintained in a predetermined relationship.

2. A flexible aerofoil as claimed in claim 1, wherein said means connecting each of said rods to two of said members comprises a tapered cam secured to each of said rods, said cam having flanged sides which are slideable in flanged channels secured to said members.

3. A flexible aerofoil as claimed in claim 1, wherein said means of maintaining said suction and pressure skins in a predetermined relationship comprises rollers mounted on pillars extending inwardly from said suction skin, said rollers bearing against surfaces of flanges secured to said members.

* * * * *